(12) United States Patent
Tiller et al.

(10) Patent No.: US 9,887,723 B2
(45) Date of Patent: Feb. 6, 2018

(54) COMMUNICATIONS DEVICE MOUNTING ASSEMBLY

(71) Applicant: Thru2Market Solutions (HK) Limited, Shatin (HK)

(72) Inventors: Robert Tiller, New South Wales (AU); Adam Hobbs, New South Wales (AU)

(73) Assignee: Thru2Market Solutions Limited, Shatin (HK)

( * ) Notice: Subject to any disclaimer, the term of this patent is extended or adjusted under 35 U.S.C. 154(b) by 0 days.

(21) Appl. No.: 15/374,069

(22) Filed: Dec. 9, 2016

(65) Prior Publication Data

US 2017/0170860 A1    Jun. 15, 2017

(30) Foreign Application Priority Data

Dec. 10, 2015    (AU) .................................. 2015905112

(51) Int. Cl.
*H04M 1/00*    (2006.01)
*H04B 1/3883*  (2015.01)

(52) U.S. Cl.
CPC ................................. *H04B 1/3883* (2013.01)

(58) Field of Classification Search
CPC .. H04B 1/3883; H04B 1/3877; H04B 1/3888; H04B 1/3816
See application file for complete search history.

*Primary Examiner* — Xin Jia
(74) *Attorney, Agent, or Firm* — Wood, Phillips, Katz, Clark & Mortimer (57) ABSTRACT

A communications device mounting assembly (40). The assembly (40) includes a first mounting part (42), a second mounting part (44) and a pivotable connection (46, 48). The first mounting part (42) is adapted for magnetic engagement with a magnetically attractable part (162) affixed to, or forming part of, a communications device (160). The second mounting part (44) is adapted for magnetic engagement with a surface or component (60) affixed to, or forming part of, the surface or component (60). The pivotable connection (46, 48) between the first mounting part (42) and the second mounting part (44) is adapted to allow the first mounting part (42) to be angularly moveable relative to the second mounting part (44). The strength of magnetic engagement between the first mounting part (42) and the magnetically attractable part (162) is less than the strength of magnetic engagement between the second mounting part (44) and the surface or component (60), such that during the application of a sufficiently large separating force between the magnetically attractable part (162) and the surface or component (60), the magnetic engagement between the first mounting part (42) and the magnetically attractable part (162) will release preferentially ahead of the engagement between the second mounting part (44) and the surface or component (60).

14 Claims, 10 Drawing Sheets

COMMUNICATIONS DEVICE MOUNTING ASSEMBLY

FIELD OF THE INVENTION

The present invention relates to a communications device mounting assembly.

The invention has been primarily developed for use in mounting a smartphone (e.g. iPhone) to various surfaces and other components and will be described hereinafter with reference to this application. However, the invention is also applicable for use with other communication devices such as tablets (e.g. iPads) and other portable electronic devices with a sufficiently sized flat mounting surface and weighing less than about 380 grams.

BACKGROUND OF THE INVENTION

Various devices are known that are used to mount smartphones, tablets and other communication devices using manual or magnetic connectors. However, a disadvantage of existing devices is they do not allow the communications device to easily move between different mounting environments. Existing mounting devices for one environment also can not be used with mounting devices suited for another environment. For example, a smartphone car windscreen mount is suitable for mounting a smartphone to a car windscreen only, and can not be used with a household mounting device.

OBJECT OF THE INVENTION

It is an object of the present invention to substantially overcome or at least ameliorate the above disadvantage.

SUMMARY OF INVENTION

Accordingly, in a first aspect, the present invention provides a communications device mounting assembly, the assembly including:

a first mounting part adapted for magnetic engagement with a magnetically attractable part affixed to, or forming part of, a communications device;

a second mounting part adapted for magnetic engagement with a surface or component affixed to, or forming part of, the surface or component; and a pivotable connection between the first mounting part and the second mounting part adapted to allow the first mounting part to be angularly moveable relative to the second mounting part, wherein the strength of magnetic engagement between the first mounting part and the magnetically attractable part is less than the strength of magnetic engagement between the second mounting part and the surface or component, such that during the application of a sufficiently large separating force between the magnetically attractable part and the surface or component, the magnetic engagement between the first mounting part and the magnetically attractable part will release preferentially ahead of the engagement between the second mounting part and the surface or component.

The first mounting part and the second mounting part are preferably provided on opposite sides of the assembly, and either side of the pivotable connection respectively.

The pivotable connection preferably includes a ball and socket arrangement, most preferably adapted to allow for a 30 degree cone of relative movement.

The first mounting part preferably includes a recessed female magnetic region. The magnetically attractable part affixed to, or forming part of, the communications device preferably includes a male protruding region adapted for location within the recessed female magnetic region.

The second mounting part includes a male protruding magnetic region, of opposite magnetic polarity to the recessed female magnetic region.

In a second aspect, the present invention provides a communications device mounting assembly, the assembly including:

a first mounting part adapted for magnetic engagement with a magnetically attractable part affixed to, or forming part of, a communications device;

a second mounting part adapted for magnetic engagement surface or component affixed to, or forming part of, the surface; and a pivotable connection between the first mounting part and the second mounting part adapted to allow the first mounting part to be angularly moveable relative to the second mounting part, wherein the first mounting part includes a recessed female magnetic region and the magnetically attractable part affixed to, or forming part of, the communications device includes a male protruding region adapted for location within the recessed female magnetic region.

The second mounting part includes a male protruding magnetic region, of opposite magnetic polarity to the recessed female magnetic region.

The strength of magnetic engagement between the first mounting part and the magnetically attractable part is preferably less than the strength of magnetic engagement between the second mount and the surface or component, such that during the application of a sufficiently large separating force between the magnetically attractable part and the surface or component, the magnetic engagement between the first mounting part and the magnetically attractable part will release preferentially ahead of the engagement between the second mounting part and the surface or component.

The first mounting part and the second mounting part are preferably provided on opposite sides of the assembly, and either side of the pivotable connection respectively.

The pivotable connection preferably includes a ball and socket arrangement, most preferably adapted to allow for a 30 degree cone of relative movement.

The first mounting part and the second mounting part are preferably provided on opposite sides of the assembly.

In a third aspect, the present invention provides a communications device mounting kit, the kit including:

the communications device mounting assembly defined in the first aspect or the second aspect; and a supplementary mounting device having a third mounting part adapted for magnetic engagement with the second mounting part of the communications device mounting assembly, wherein the strength of magnetic engagement between the first mounting part and the magnetically attractive part is less than the strength of magnetic engagement between the second mounting part and the third mounting part, such that during the application of a sufficiently large separating force between the magnetically attractive part and the supplementary mounting device, the magnetic engagement between the first mounting part and the magnetically attractive part will release preferentially ahead of the engagement between the second mounting part and third mounting part.

The third mounting part preferably includes a recessed female magnetic region.

The supplementary mounting device preferably includes a suction apparatus, on the opposite side to the third mounting part.

The supplementary mounting device preferably includes AMPS mounting surface, on the opposite side to the third mounting part.

In a fourth aspect, the present invention provides a communications device mounting assembly, the assembly including:

a first mounting part adapted for magnetic engagement with a magnetically attractable part affixed to, or forming part of, a communications device;

a second mounting part adapted for clamping engagement with a vehicle vent;

wherein the strength of magnetic engagement between the first mounting part and the magnetically attractable part is less than the strength of clamping engagement between the second mounting part and the vent, such that during the application of a sufficiently large separating force between the magnetically attractable part and the surface or component, the magnetic engagement between the first mounting part and the magnetically attractable part will release preferentially ahead of the engagement between the second mounting part and the vent.

The first mounting part preferably includes a recessed female magnetic region. The magnetically attractable part affixed to, or forming part of, the communications device preferably includes a male protruding region adapted for location within the recessed female magnetic region.

In a fifth, the present invention provides a communications device mounting assembly, the assembly including:

a first mounting part adapted for magnetic engagement with a magnetically attractable part affixed to, or forming part of, a communications device;

a second mounting part adapted for clamping engagement with a vehicle handlebar;

wherein the strength of magnetic engagement between the first mounting part and the magnetically attractable part is less than the strength of clamping engagement between the second mounting part and the handlebar, such that during the application of a sufficiently large separating force between the magnetically attractable part and the surface or component, the magnetic engagement between the first mounting part and the magnetically attractable part will release preferentially ahead of the engagement between the second mounting part and the handlebar.

The first mounting part preferably includes a recessed female magnetic region. The magnetically attractable part affixed to, or forming part of, the communications device preferably includes a male protruding region adapted for location within the recessed female magnetic region.

BRIEF DESCRIPTION OF THE DRAWINGS

Preferred embodiments of the present invention will now be described, by way of examples only, with reference to the accompanying drawings, in which:

FIG. 31 shows the smartphone of FIG. 24 and the assembly of FIG. 14 positioned for engagement with one another;

DETAILED DESCRIPTION OF THE PREFERRED EMBODIMENTS

Figure 1:
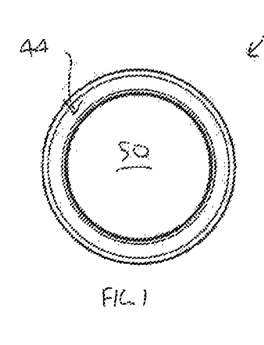
FIG. 1 is a front view of a first embodiment of a communications device mounting assembly.
Figure 2:
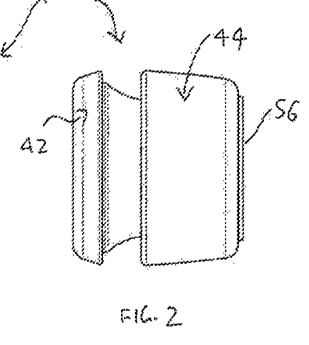
FIG. 2 is a side view of the assembly shown in FIG. 1.
Figure 3:
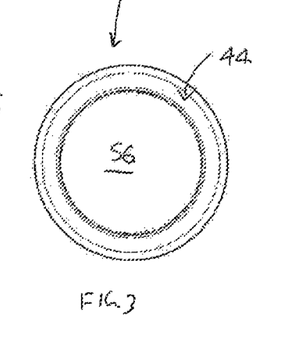
FIG. 3 is a rear view of the assembly shown in FIG. 1.
Figure 4:
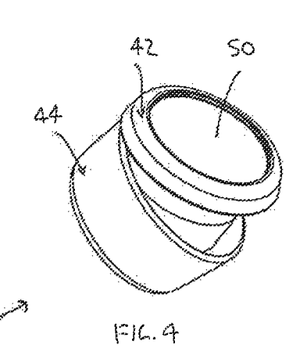
FIG. 4 is a perspective view of the assembly shown in FIG. 1 in an angled configuration.
Figure 5:
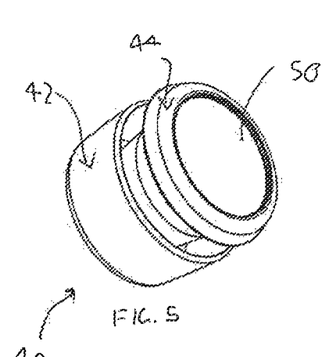
FIG. 5 is a perspective view of the assembly shown in FIG. 1 in an aligned configuration.
Figure 6:
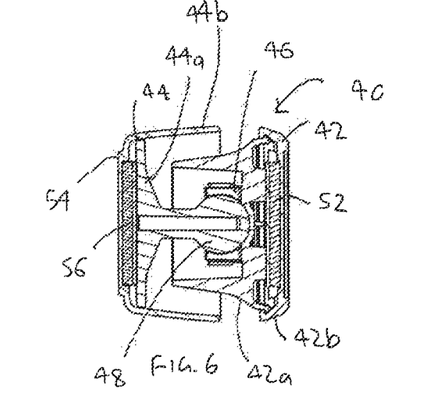
FIG. 6 is a cross sectional side view of the assembly shown in FIG. 1.

FIG. 1 to 6 show a first embodiment of a communications device mounting assembly 40. The device 40 includes a first mounting part 42 and a second mounting part 44. The first and second mounting parts 42 and 44 are pivotably connected to one another by a ball 48 and socket 46 arrangement with the socket 46 being associated with the first mounting part 42 and the ball 48 being associated with the second mounting part 44. As best shown in FIG. 4, the ball and socket arrangement 46, 48 allows the first mounting part 42 and second part mounting part 44 to be moved angularly with respect to each other within a 30 degree conical range of movement.

The first mounting part 42 includes a shallow cylindrically shaped recessed female region 50 under which is positioned a first magnet 52. The second mounting part 44 includes a shallow cylindrical shaped male protruding region 54 under which is located a second magnet 56. The magnets are of the polymagnet type, as generally described in U.S. Pat. No. 7,800,471.

The first mounting part 42 is formed from an inner part 42a and an outer part 42b which are both injection moulded from plastic materials, such as PC ABS, and which sandwich the first magnet 52 therebetween when mounted to each other by a cylindrical clip arrangement. The second mounting part 44 similarly includes an inner part 44a and an outer part 44b with the second magnet 56 sandwiched therebetween.

The outwardly facing surfaces of the first and second magnets 52 and 56 are of reverse polarity to one another. The first magnet 52 has a pull force of approximately 35 Newtons and the second magnet has a pull force 56 of approximately 45 Newtons. The relevance of the pull strength of the first magnet 52 being lower than that of the second magnet 56 will be described in more detail below.

Figure 7:
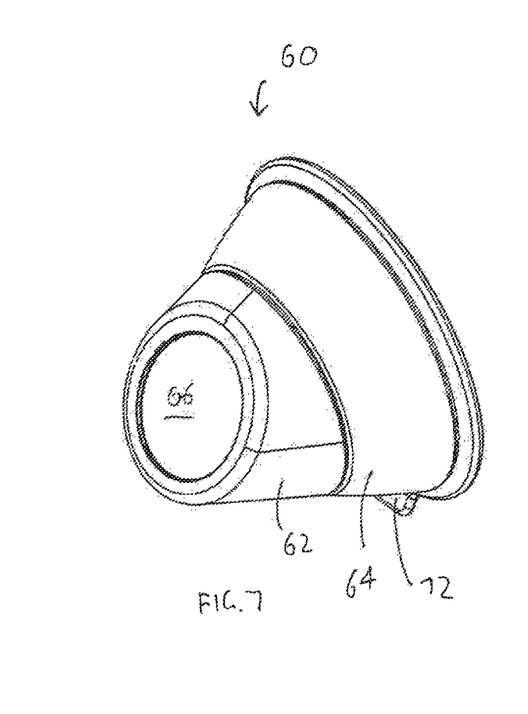
FIG. 7 is a front perspective view of a second embodiment of a communications device mounted assembly.
Figure 8:
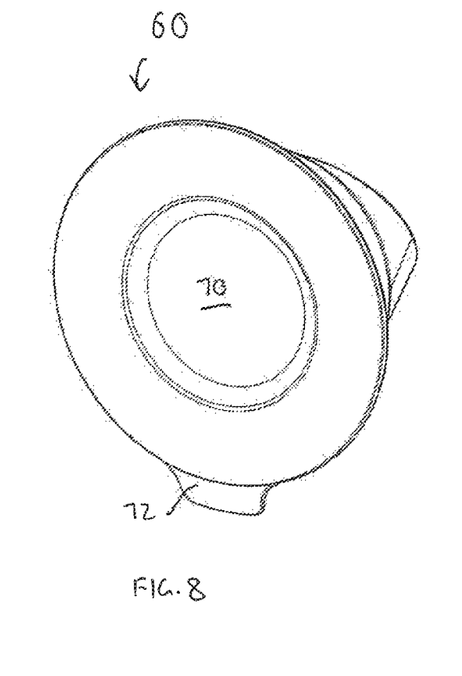
FIG. 8 is a rear view perspective view of the assembly shown in FIG. 7.
Figure 9:
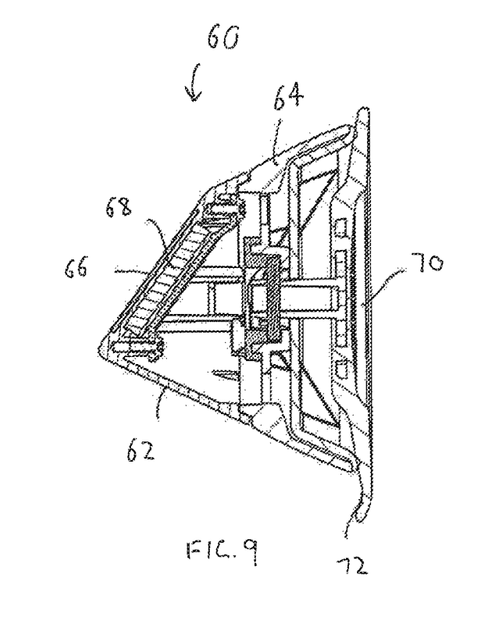
FIG. 9 is a cross sectional side view of the assembly shown in FIG. 7.
Figure 10:
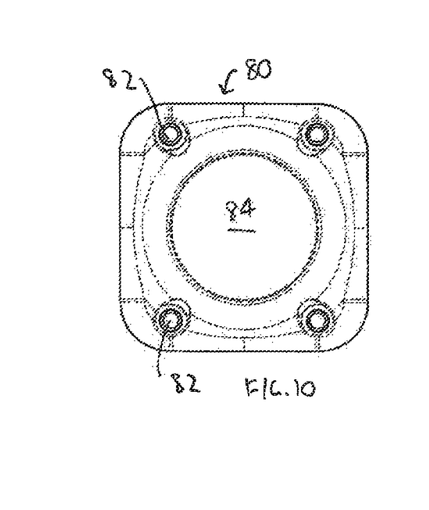
FIG. 10 is a front view of a third embodiment of a communications device mounting assembly.

FIGS. 7 to 9 show a second embodiment of communications device mounting assembly 60. The assembly 60 has a top part 62 and a base part 64 of generally truncated, conical shape. The top part 62 includes a third mounting part with a recessed female magnetic region 66 (similar to the region 50) associated with a third magnet 68. The base part 64 includes a silicon suction cup 70 with a release tab 72. The assembly 60 has an internal mechanism configured such that relative rotational movement between the top part 62 and the base part 64 draws the center of the suction cup 70 inwardly into the assembly 60, thereby creating suction against any flat surface upon which the assembly 60 is placed.

FIGS. 10 to 13 show a third embodiment of a communications device mounting assembly 80, in the well-known AMPS format. The assembly 80 includes four mounting holes 82 and a recessed female magnetic region 84 (similar to the region 50) associated with a fourth magnet 86.

Figures 14, 15, 16, 18, 19:
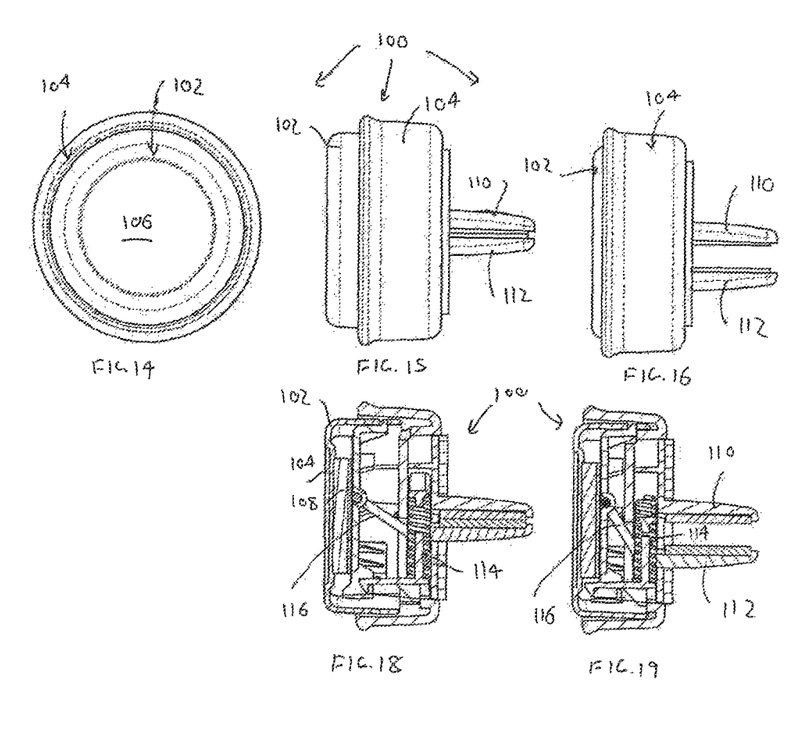
FIG. 14 is a front view of a fourth embodiment of a communications device mounting assembly.
FIG. 15 is a side view of the assembly shown in FIG. 14 in a closed configuration.
FIG. 16 is a side view of the assembly shown in FIG. 14 in an open configuration.
FIG. 18 is a cross sectional side view of the assembly shown in FIG. 15.
FIG. 19 is a cross sectional side view of the assembly shown in FIG. 16.
Figure 17:
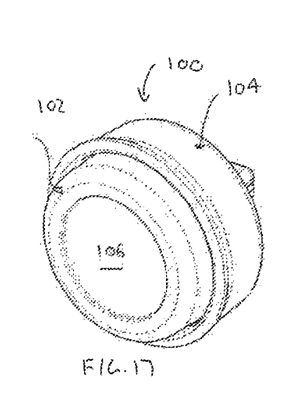
FIG. 17 is a perspective view of the assembly shown in FIG. 14.

FIGS. 14 to 19 show a fourth embodiment of a communications device mounting assembly 100. The assembly 100 includes a top part 102 and a base part 104. The top part 102 includes a recessed female magnetic region 106 (similar to the region 50) associated with a fifth magnet 108. The movable jaw 112 is biased towards the fixed jaw 110 by a spring 114. The movable jaw 112 is also connected to the top part 102 by a pivoting link 116. When the top part 102 is depressed and driven into the base part 104, the link 116 drives the movable jaw 112 away from the fixed jaw 110 against the bias of the spring 114. This open position is shown in FIG. 19 and allows the assembly 100 to be positioned with the fixed jaw 110 and the movable jaw 112 either side of a blade of a vehicle vent. When the depression of the top part 102 is released, the spring 114 drives the movable jaw 112 towards the fixed jaw 110 to clamp the assembly 100 relative to the vent blade.

Figure 20:
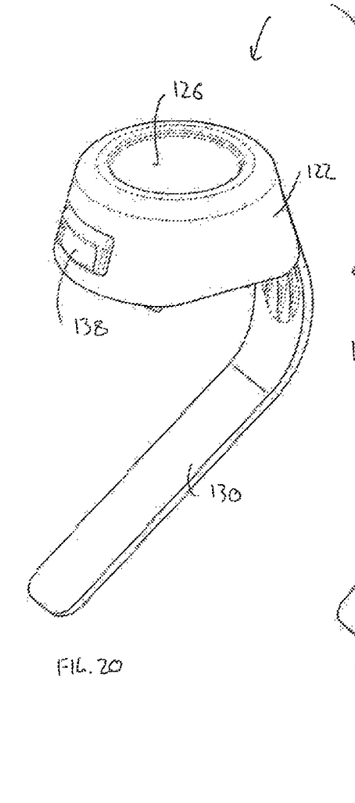
FIG. 20 is a perspective view of a fifth embodiment of the communications device mounting assembly in a closed configuration.
Figures 21, 22, 23:
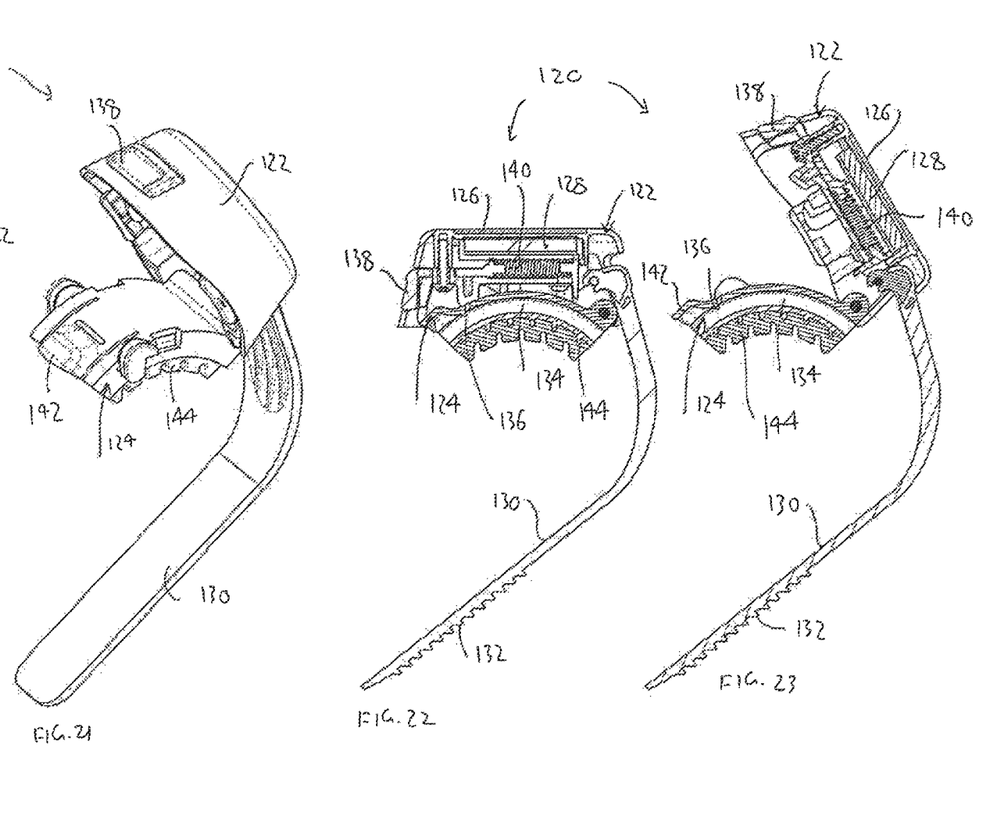
FIG. 21 is a perspective view of the assembly shown in FIG. 20 in an open configuration.
FIG. 22 is a cross sectional side view of the assembly shown in FIG. 20.
FIG. 23 is a cross sectional side view of the assembly in FIG. 21.

FIG. 20 shows a fifth embodiment of a communications device mounting assembly 120 suitable for installation around a bicycle or motorcycle handle bar (or other cylindrical or elongate object). The assembly 120 includes a top part 122 and a base part 124. The top part 122 includes a recessed female magnetic region 126 (similar to the region 50) associated with a sixth magnet 128. The base part 124 includes a flexible strap 130. The distal end of the strap 130 has a set of barbs 132. The base part 124 also includes a slot 134 for receiving the distal end of the strap 130 and a catch 136 which is able to engage with the barbs 132. The strap 130 is loop around the handle bar whilst the top part 122 is in the open position shown in FIG. 23. After the distal end of the strap 130 has been positioned within the slot 134 at a suitable location, the top part 122 is pivoted to the closed position 22, which drives the catch 136 into engagement with the barbs 132, thereby locking the assembly 120 to the handle bar. The top part 122 also includes a catch 138, which is biased to a locking position by a spring 140. The catch 138 engages with a hump 142 on the base part 124 when in the closed position shown in FIG. 22. Pressing the catch 138 inwardly releases this engagement and allows the top part 122 to be moved to the open position shown in FIG. 23.

The base part also includes a cushion 144 to assist in securely locating the assembly 100 around the handle bar.

The use of the assemblies described above will now be described.

Figure 24:
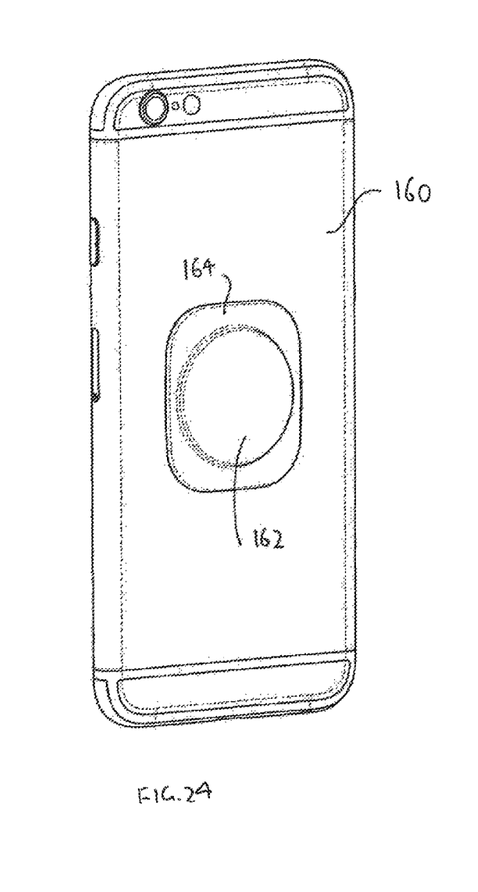
FIG. 24 is a perspective view of a smartphone with a shim mounted thereon.

FIG. 24 shows a smartphone 160 to which has been adhered a thin cylindrical disc or shim 162 that is covered by a thin adhesive sheet 164. The outer diameter of the shim 162 is only slightly less than the inner diameter of the recessed female region 50 on the assembly 40.

Figure 25:
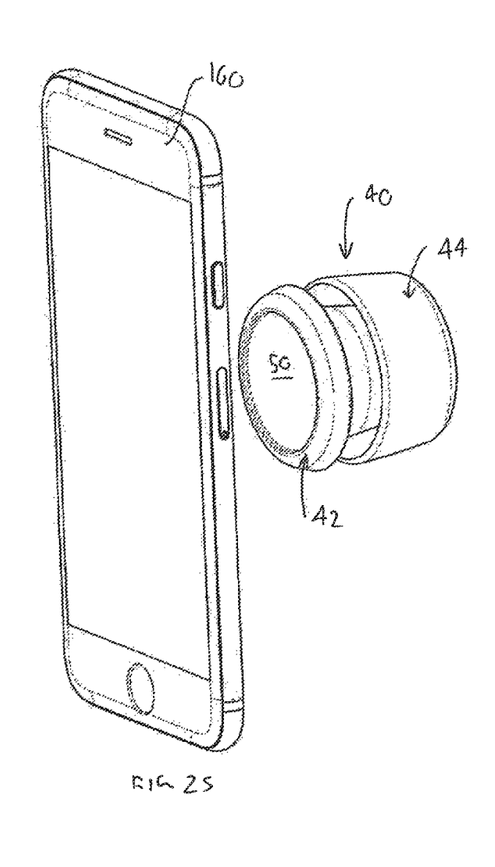
FIG. 25 shows the smartphone in FIG. 24 positioned for engagement with the assembly shown in FIG. 1.
Figure 26:
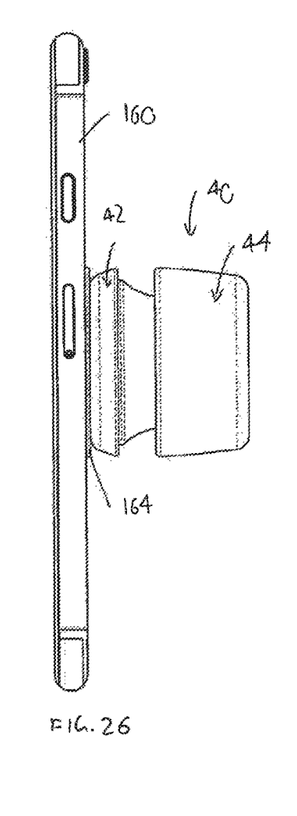
FIG. 26 is a side view of the components shown in FIG. 25 in an engaged configuration.

FIG. 25 shows the smartphone 160 being positioned for engagement with the assembly 40 described in FIGS. 1 to 6. FIG. 26 shows the smartphone 160 mounted to the assembly 40 due to the magnetic attracting force between the first magnet 52 and the shim 162. The magnetic attracting force locates the smartphone 160 relative to the assembly 140 in the longitudinal direction. The engagement of the protruding shim 162 within the recessed magnetic region 50 locates the smartphone laterally with respect to the assembly 40, whilst still allowing the smartphone 160 to be manually pivoted with respect to the assembly 40 without losing the engagement therebetween. The ball and socket arrangement 46 and 48 also allows the smartphone 160 to be pivoted relative to the second part 44 of the assembly 40 for optimum positioning of same.

The second magnet 56 of the assembly 40 can be used to mount the smartphone 160 to any magnetic attractable surface, such as refrigerator or other kitchen appliance, by placing the male region 54 against the surface. As the magnetic attraction between the smartphone 160 and the first magnet 52 is less than that between the second magnet 56 and the mounting surface, the smartphone can be easily removed from the assembly 40, leaving the assembly 40 in place on the surface for future use.

Figure 27:
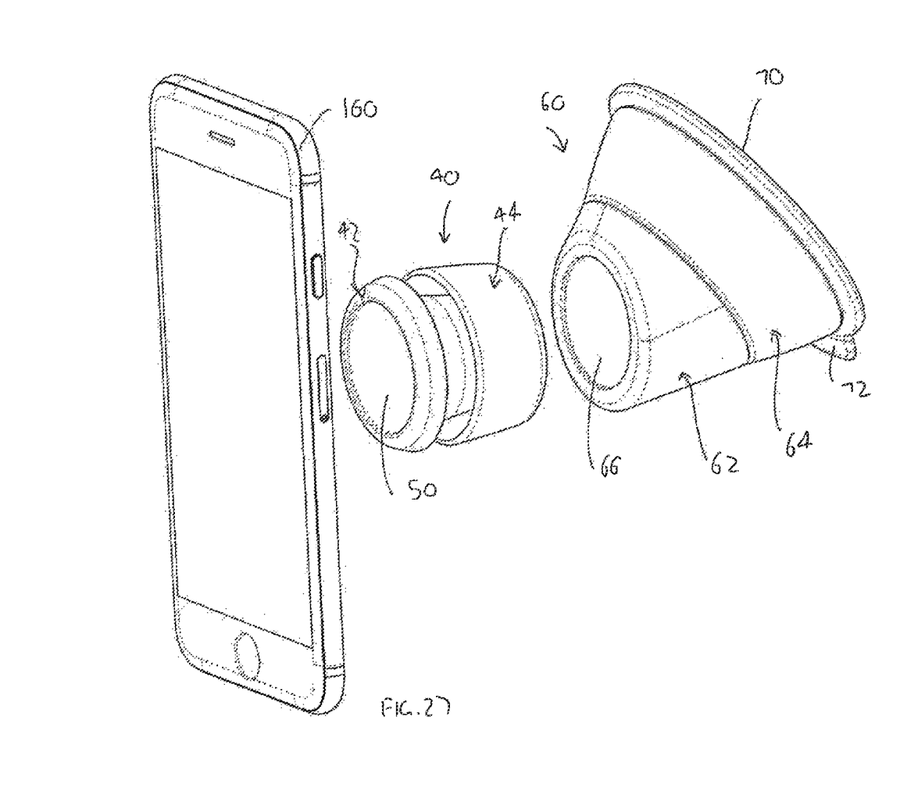
FIG. 27 is a perspective view of the smartphone shown in FIG. 24, the mounting assembly in FIG. 1 and the mounting assembly shown in FIG. 7 positioned for engagement with of one another.
Figure 28:
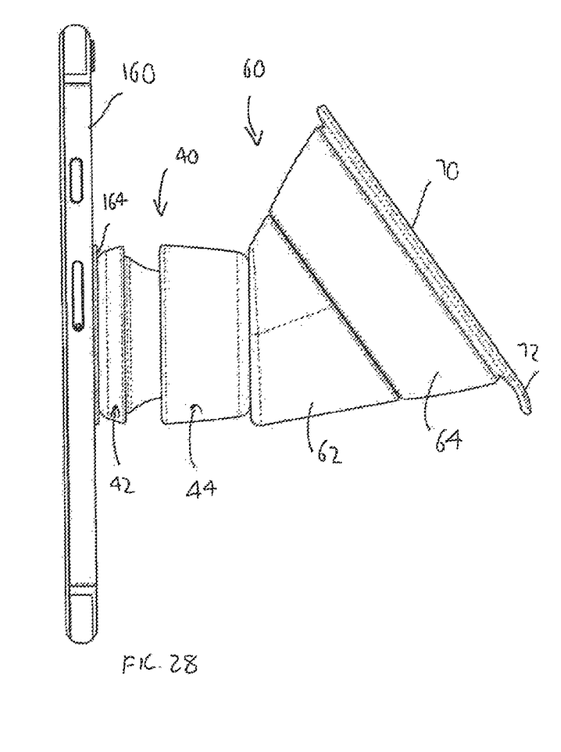
FIG. 28 is a side view of the components shown in FIG. 27 in an engaged configuration.

FIG. 27 shows the smartphone 160, the assembly 40 and the assembly 60, as described in FIGS. 7 to 9, positioned for engagement with one another. FIG. 28 shows these components after engagement with one another. The smartphone 160 is located with respect to the assembly 40 by the previously described engagement between the shim 162 in the recessed female region 50. A similar engagement occurs between the assembly 40 and the assembly 60 with the raised male region 56 of the assembly 40 being received within the recessed female region 66 of the assembly 60. The polarity of the magnet 56 associated with the male region 54 is opposite to, and thus attractive with, the polarity of the magnet 68 associated with the recessed female region 66, The polarity of the magnets 52 and 56 are the same and thus repelling in order to ensure that the components are always connected in the correct orientation shown in FIG. 28, with the corresponding male and female regions engaging with one another.

The magnetic attraction between the smartphone 160 and the assembly 40 is less than that of the magnetic attraction between the assembly 40 and the assembly 60. Accordingly, when a user desires to remove the smartphone 160 from its mounting, it will release whilst leaving the assemblies 40 and 60 in place.

As previously mentioned, the assembly 60 is suitable for suction attachment with glass (e.g. a windscreen) or other smooth surfaces. The desired position and orientation of the smartphone 160 relative to the surface to which the second assembly 60 is mounted can be easily adjusted by rotating the smartphone 160 relative to the first assembly 40, adjusting the angle of the smartphone 160 relative to the second part 44 of the assembly and by turning the second assembly 60 prior to its suction engagement with the surface.

Figures 11, 12:
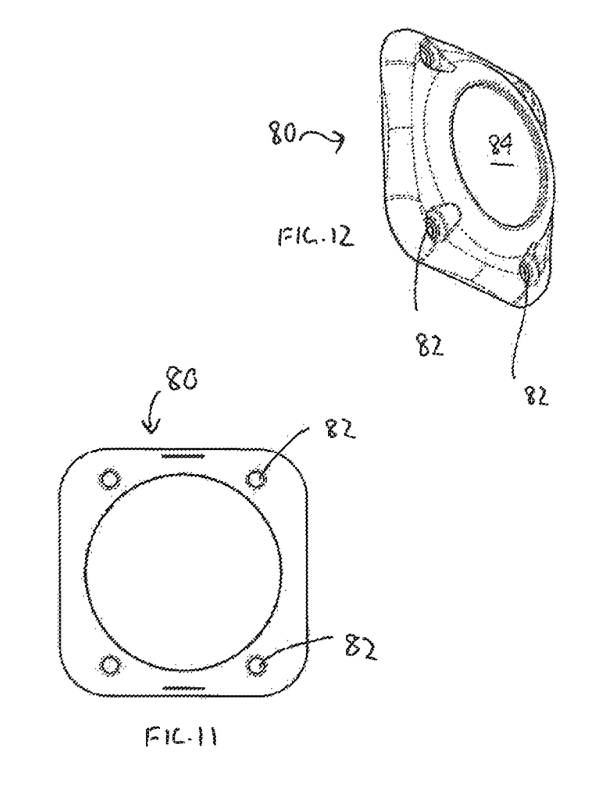
FIG. 11 is a rear view of the assembly shown in FIG. 10.
FIG. 12 is a perspective view of the assembly shown in FIG. 10.
Figure 13:
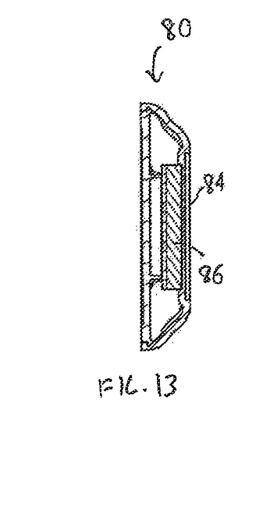
FIG. 13 is a cross sectional side view of the assembly shown in FIG. 10.
Figure 29:
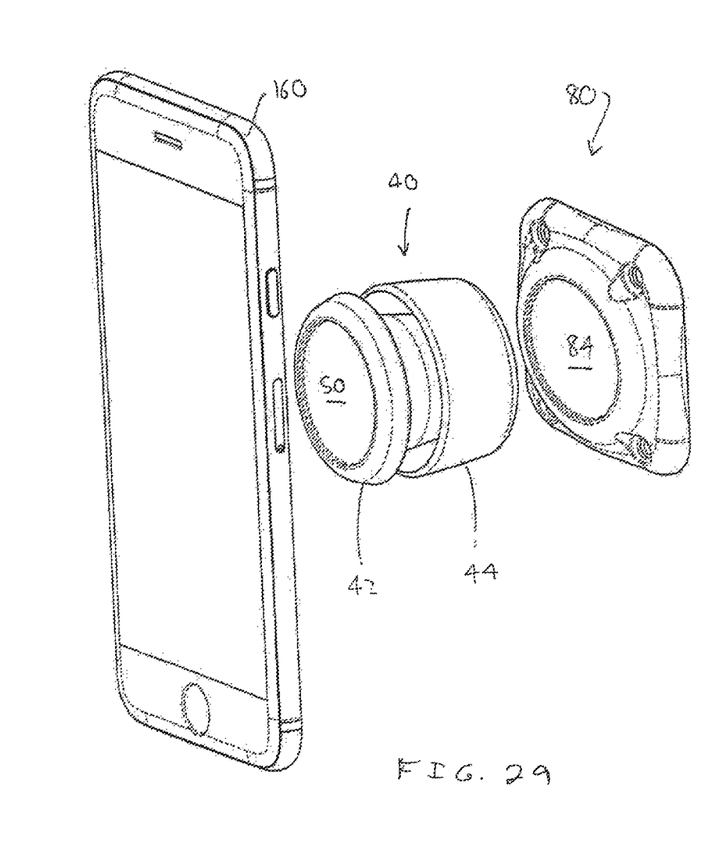
FIG. 29 is a perspective view showing the smartphone shown in FIG. 24, the assembly shown in FIG. 1 and the mounting assembly shown in FIG. 10 positioned for engagement with one another.
Figure 30:
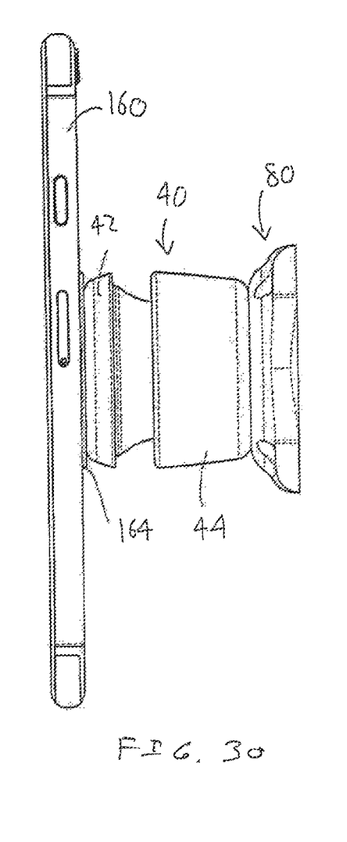
FIG. 30 is a side view showing the components of FIG. 29 engaged with one another.

FIGS. 29 and 30 show the smartphone 160 and the assembly 40 being used with the assembly 80 shown in FIGS. 11 to 13. As with earlier embodiments, the angle, orientation and position of the smartphone 160 can be easily adjusted relative to the assembly 80 and the magnetic attraction between the smartphone 160 and the assembly 40 releases preferentially over that between the assembly 40 and the assembly 80. In addition, as with all the previous embodiments, the polarity of the various magnets ensures that the components can only be assembled in the correct relative orientation shown.

Figure 32:
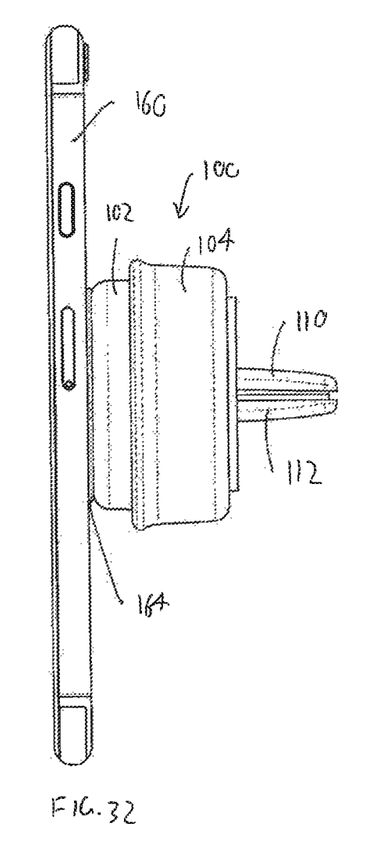
FIG. 32 is a side view of the components shown in FIG. 31 in an engaged configuration.

FIGS. 31 and 32 show the smartphone 160 being used with the assembly 100 shown in FIGS. 14 to 19. As with the earlier embodiments, the shim 162 is magnetically engaged with the magnet 108 and received and located within the recessed female region 106. The magnetic attraction between the smartphone 160 and the assembly 100 is less than the clamping engagement between the assembly 100 and a vent blade, such that the smartphone 160 can be easily removed from the assembly 100, leaving the assembly 100 engaged with the vent blade for future use.

Figure 33:
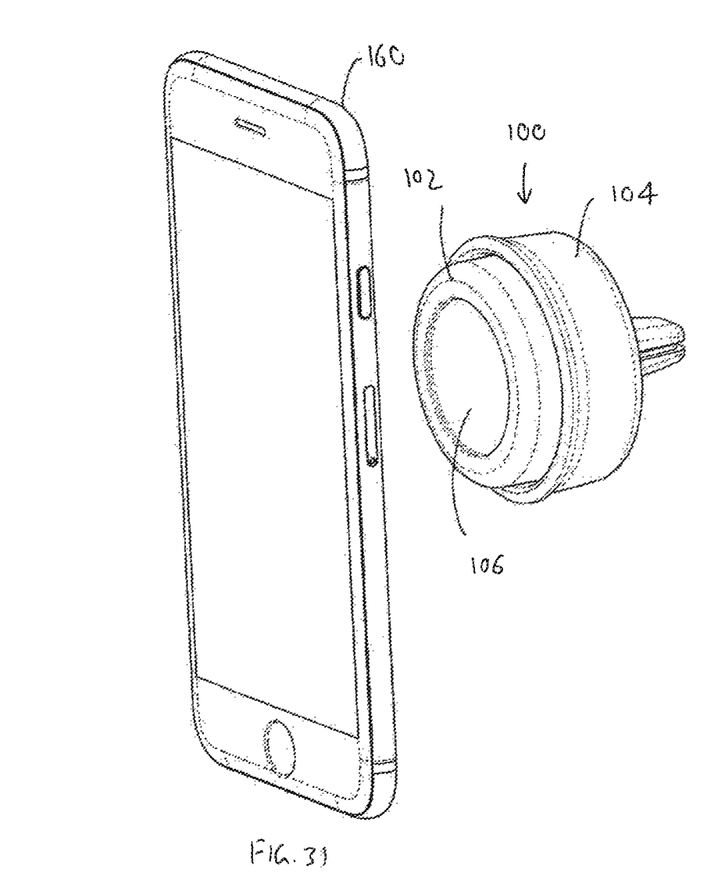
FIG. 33 shows a smartphone of FIG. 24 and the assembly of FIG. 20 positioned for engagement with one another.
Figure 34:
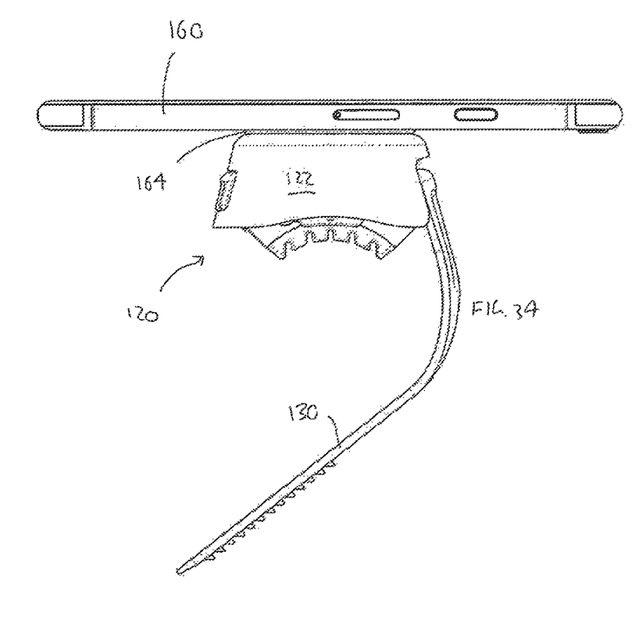
FIG. 34 is a side view of the components shown in FIG. 33 in an engaged configuration.

FIGS. 33 and 34 show the smartphone 160 used with the assembly 120 shown in FIGS. 20 to 23. As with the earlier embodiments, the shim 162 magnetically engages with the magnet 128 and is also located within the recessed female region 126. Again as with the earlier embodiments, the magnetic attraction between the smartphone 160 and the assembly 120 is less than the clamping engagement between the assembly 120 and a handle bar, such that the smartphone can be easily removed leaving the assembly 120 in place for future use.

The assemblies described above have numerous advantages. Firstly, they provide a fast, easy and intuitive mechanism that can mount a smartphone or similar device to a mounting assembly, with that mounting being secure, adjustable and easily releasable. Incorrect mounting is avoided due to the relative polarities of the various magnets. The smartphone can also be quickly and easily be swapped from one mounting assembly type to another, for example as a user moves between household locations, vehicles and performs various tasks. This relocation is aided by the preferential release of the smartphone only, over that of the mounts (which can be used alone or in combination). It is envisaged that a user will have several different type of mounting assemblies at various home, work, recreation, vehicle and other locations.

The assembly 40 can also be used in isolation as a magnetic device per se, for example as a fridge magnet, to locate items against a metallic surface.

Although the invention has been described with reference to the preferred embodiments, it will be appreciated by person skilled in the art that the invention can be embodied in many other forms. For example, neo type magnets can also be used with the assemblies described above. Also, the shim can be incorporated into the original construction of the smartphone or to a case or cover for same.

The invention claimed is:

1. A communications device mounting assembly, the assembly including:
   a first mounting part adapted for magnetic engagement with a magnetically attractable part affixed to, or forming part of, a communications device;
   a second mounting part adapted for magnetic engagement with a surface or component affixed to, or forming part of, the surface or component; and
   a pivotable connection between the first mounting part and the second mounting part adapted to allow the first mounting part to be angularly moveable relative to the second mounting part,
   wherein the strength of magnetic engagement between the first mounting part and the magnetically attractable part is less than the strength of magnetic engagement between the second mounting part and the surface or component, such that during the application of a sufficiently large separating force between the magnetically attractable part and the surface or component, the magnetic engagement between the first mounting part and the magnetically attractable part will release preferentially ahead of the engagement between the second mounting part and the surface or component.

2. The communications device mounting assembly as claimed in claim 1, wherein the first mounting part and the second mounting part are provided on opposite sides of the assembly, and either side of the pivotable connection respectively.

3. The communications device mounting assembly as claimed in claim 1, wherein the pivotable connection includes a ball and socket arrangement.

4. The communications device mounting assembly as claimed in claim 3, wherein the ball and socket arrangement is adapted to allow for a 30 degree cone of relative movement.

5. The communications device mounting assembly as claimed in claim 1, wherein the first mounting part includes a recessed female magnetic region.

6. The communications device mounting assembly as claimed in claim 5, wherein the magnetically attractable part affixed to, or forming part of, the communications device includes a male protruding region adapted for location within the recessed female magnetic region.

7. The communications device mounting assembly as claimed in claim 6, wherein the second mounting part includes a male protruding magnetic region, of opposite magnetic polarity to the recessed female magnetic region.

8. A communications device mounting assembly, the assembly including:
   a first mounting part adapted for magnetic engagement with a magnetically attractable part affixed to, or forming part of, a communications device;

a second mounting part adapted for magnetic engagement with a surface or component affixed to, or forming part of, the surface; and a pivotable connection between the first mounting part and the second mounting part adapted to allow the first mounting part to be angularly moveable relative to the second mounting part, wherein the first mounting part includes a recessed female magnetic region and the magnetically attractable part affixed to, or forming part of, the communications device includes a male protruding region adapted for location within the recessed female magnetic region.

9. The communications device mounting assembly as claimed in claim 8, wherein the second mounting part includes a male protruding magnetic region, of opposite magnetic polarity to the recessed female magnetic region.

10. The communications device mounting assembly as claimed in claim 8, wherein the strength of magnetic engagement between the first mounting part and the magnetically attractable part is less than the strength of magnetic engagement between the second mount and the surface or component, such that during the application of a sufficiently large separating force between the magnetically attractable part and the surface or component, the magnetic engagement between the first mounting part and the magnetically attractable part will release preferentially ahead of the engagement between the second mounting part and the surface or component.

11. The communications device mounting assembly as claimed in claim 8, wherein the first mounting part and the second mounting part are provided on opposite sides of the assembly, and either side of the pivotable connection respectively.

12. The communications device mounting assembly as claimed in claim 8, wherein the pivotable connection includes a ball and socket arrangement.

13. The communications device mounting assembly as claimed in claim 12, wherein the ball and socket arrangement is adapted to allow for a 30 degree cone of relative movement.

14. The communications device mounting assembly as claimed in claim 8, wherein the first mounting part and the second mounting part are provided on opposite sides of the assembly.

\* \* \* \* \*